United States Patent [19]

Probst et al.

[11] Patent Number: 4,904,727
[45] Date of Patent: Feb. 27, 1990

[54] EMULSION POLYMERS

[75] Inventors: Joachim Probst, Leverkusen; Wolfgang Henning, Kuerten; Heinz Bäumgen, Leverkusen; Joachim König, Odenthal, all of Fed. Rep. of Germany

[73] Assignee: Bayer Aktiengesellschaft, Leverkusen, Fed. Rep. of Germany

[21] Appl. No.: 318,045

[22] Filed: Mar. 2, 1989

Related U.S. Application Data

[62] Division of Ser. No. 196,167, May 18, 1988, abandoned.

[30] Foreign Application Priority Data

Jun. 3, 1987 [DE] Fed. Rep. of Germany ....... 3718520

[51] Int. Cl.$^4$ ..................... C08L 33/00; C08F 220/12
[52] U.S. Cl. ................................. 524/820; 526/329.3
[58] Field of Search ...................... 524/820; 526/329.3

[56] References Cited

U.S. PATENT DOCUMENTS

| 4,373,053 | 2/1983 | Sato et al. | 524/457 |
| 4,434,269 | 2/1984 | Probst et al. | 524/829 |
| 4,670,100 | 6/1987 | Henning et al. | 524/840 |

Primary Examiner—Joseph L. Schofer
Assistant Examiner—N. Sarofim
Attorney, Agent, or Firm—Sprung Horn Kramer & Woods

[57] ABSTRACT

Emulsion polymers obtained by emulsifying a monomer mixture of
(A) 5–95% by weight of acrylonitrile, methacrylonitrile and/or substituted or unsubstituted styrene and
(B) 5–95% by weight of acrylic and/or methacrylic acid esters containing 1-12 carbon atoms in the alcohol group, the sum of components (A)+(B) amounting to 100% by weight, in the presence of an aqueous solution or dispersion of a water soluble or water dispersible, cationically modified polyurethane, and subjecting the resulting emulsion to a radically initiated polymerization. The emulsion polymers are preferably used as paper sizes or in paper sizes together with conventional additives.

9 Claims, No Drawings

EMULSION POLYMERS

This is a division of application Ser. No. 196,167, filed 5/18/88, now abandoned.

This invention relates to emulsion polymers obtained by emulsifying a monomer mixture of
- (A) 5–95% by weight of acrylonitrile, methacrylonitrile and/or substituted or unsubstituted styrene and
- (B) 5–95% by weight of acrylic and/or methacrylic acid esters containing 1–12 carbon atoms in the alcohol group, the sum of components (A)+(B) amounting to 100% by weight, in the presence of an aqueous solution or dispersion of a water soluble or water dispersible, cationically modified polyurethane, and subjecting the resulting emulsion to a radically initiated polymerisation.

The emulsion polymers are preferably used as paper sizes or in paper sizes together with conventional additives.

It is known (see DE-OS 24 00 490 and DE-OS 35 23 856) to prepare cationic paper sizes in the form of aqueous polyurethane solutions or dispersions or partial dispersions. In these sizes the polyurethane contains hydrophilic elements in the form of ammonium structures in addition to a hydrophobic component. These hydrophilic elements render the polyurethane soluble or dispersible in water.

The good sizing effect of these cationic polyurethanes on the surfaces of types of paper which do not contain aluminium sulphate as auxiliary agent should be particularly noted. Another major advantage is that these polymers are virtually free from any tendency to foam, in contrast to cationic polymers based on ethylenically unsaturated monomers which are obtained in the form of radically polymerised colloid-disperse solutions (see EP 00 58 313 and DE-OS 34 01 573).

The acrylic and/or methacrylic acid esters used in component (B) are most suitably those which react with (meth)acrylonitrile and/or optionally substituted styrene to form copolymers which have film forming temperatures below 100° C. The methyl, n-butyl and 2-ethyl hexyl esters of (meth)acrylic acid are particularly preferred. The following are examples of substituted styrenes (component (A)): p-methyl styrene, p-chloro styrene, and α-chloro styrene.

The aqueous solution or dispersion of a cationically modified polyurethane used as emulsifier is obtainable by the reaction of
- (a) organic polyisocyanates, optionally with the addition of organic monoisocyanates, with
- (b) compounds containing isocyanate reactive groups, optionally with the addition of
- (c) auxiliary agents and additives and conversion of the resulting polyisocyanate addition product into an aqueous solution or dispersion during or after the poly addition reaction. The compounds used as component (b) consist of or include components containing ternary or quaternary ammonium groups or groups capable of being converted into such groups, the at least partial conversion of groups capable of conversion into salt groups of the type mentioned taking place during or after the poly addition. Components (a) and/or (b) may include compounds which contain ethylene oxide units within a polyether chain and the total quantity of such hydrophilic components is calculated so that the polyisocyanate poly-addition product will contain a quantity of ternary or quarternary ammonium groups sufficient to ensure its solubility or dispersibility in water, preferably from 2 to 300 milli-equivalents of such ammonium groups per 100 g of solids content, and optionally also ethylene oxide groups of the type mentioned, preferably in an amount of from 0 to 25% by weight.

The compounds used as starting components (a) and/or (b) preferably consist at least in part of compounds containing acyl urea groups of the formula

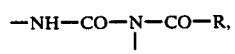

wherein R denotes an organic group, preferably a saturated or unsaturated aliphatic hydrocarbon group with 1–35 carbon atoms, an aryl group with 6–10 carbon atoms or an araliphatic group with 7–10 carbon atoms, and if several groups R are present side by side in the same molecule they may differ from one another.

The total quantity of incorporated structural units corresponding to the formula I preferably corresponds to the presence of from 0.1 to 20% by weight of acylated urea groups corresponding to the formula

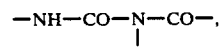

based on the solids content, in the polyisocyanate addition product.

The water soluble or water dispersible cationic polyurethane compounds used as polymeric emulsifiers are prepared by known processes, for example as described in DE-OS 33 44 693 and the literature references given there. The particularly preferred polyisocyanate poly addition products containing acyl urea groups are prepared by processes described in DE-OS 35 23 856.

The emulsifiers used according to this invention are prepared from (a) organic polyisocyanates, optionally with the addition of monofunctional isocyanates, (b) compounds containing at least two isocyanate reactive groups, optionally with the addition of corresponding monofunctional compounds, and optionally (c) further auxiliary agents and additives.

The following are examples of suitable starting components (a):
(a1) Diisocyanates corresponding to the formula Q(NCO)$_2$ in which Q denotes an aliphatic hydrocarbon group with 4 to 12 carbon atoms, a cycloaliphatic hydrocarbon group with 6 to 15 carbon atoms, an aromatic hydrocarbon group with 6 to 15 carbon atoms or an araliphatic hydrocarbon group with 7 to 15 carbon atoms. Specific examples of such preferred diisocyanates include tetramethylenediisocyanate, hexamethylene diisocyanate, dodecamethylene diisocyanate, 1,4-diisocyanatocyclohexane, 1-isocyanato-3,3,5-trimethyl-5-isocyanato-methyl-cyclohexane, 4,4'-diisocyanatodicyclohexyl methane, 4,4'-diisocyanato-dicyclohexyl propane-(2,2), 1,4-diisocyanatobenzene, 2,4-diisocyanato-toluene, 2,6-diisocyanato toluene, 4,4'-diisocyanatodiphenyl-methane, 4,4'-diisocyanatodiphenyl propane-(2,2), p-xylylene diisocyanate and α,α, α',α'-tetramethyl-m- or p-xylylene diisocyanate, and mixtures of these compounds.

The following are further examples of starting components (a):

(a2) The isocyanate-containing prepolymers known from polyurethane chemistry, which may be obtained by the reaction of simple diisocyanates of the type exemplified under (a1) with organic polyhydroxyl compounds of the type exemplified under (b1), using an NCO/OH equivalent ratio of, for example, 1.2:1 to 10:1, preferably 1.5:1 to 2.5:1. It will be seen from the above mentioned equivalent ratio that the term "isocyanate prepolymer" used in the context of the present invention also includes the so called "semi prepolymers", i.e. mixtures of excess, unreacted diisocyanates with true isocyanate prepolymers.

The following are also examples of starting components (a):

(a3) Polyisocyanates containing acyl urea groups of the general formula

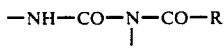

In this formula, R has the meaning already indicated above.

The polyisocyanates used as component (a3) may in principle contain several such acyl urea groups in which the individual groups R conform to the definition given but may differ from one another.

The polyisocyanates (a3) containing acyl urea groups may be either comparatively low molecular weight or relatively high molecular weight isocyanate prepolymers. Preparation of the starting components (a3) is carried out analogously to the teaching given in DE-OS 24 36 741, by partial carbodiimidisation of the isocyanate groups of organic polyisocyanates of the type exemplified under (a1) and (a2) and chemical addition of organic carboxylic acids R—COOH to the resulting carbodiimide-modified polyisocyanates. Typical examples of suitable starting components (a3) include, for example, diisocyanates corresponding to the following general formula

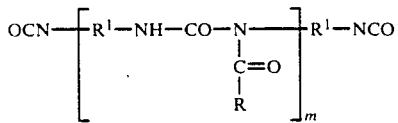

which may be prepared as follows:

in a first stage, carbodiimide groups of diisocyanatocarbodiimides corresponding to the general formula

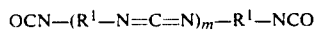

are completely or partially reacted with carboxylic acids of the general formula

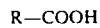

at temperatures from 25° to 100° C., optionally in the presence of a suitable solvent.

In the above formulae,

R denotes a group conforming to the definition already given for groups R,

R¹ denotes a divalent hydrocarbon group optionally containing urethane, ester and/or ether groups, such as may be obtained by removal of the isocyanate end groups from a simple organic diisocyanate or from an isocyanate prepolymer containing urethane groups and optionally ether or ester groups, and when several groups R¹ are present in the same molecule they may differ from one another but conform to the definition of the groups R¹, and m represents a whole number or a fraction (as statistical average) with a value from 1 to 10, preferably from 1 to 4.

The preparation of diisocyanatocarbodiimides is known per se and is described, for example, in U.S. Pat. Nos. 2,840,589 and 2,941,966 and by P. W. Campbell and K. C. Smeltz in Journal of Organic Chemistry, 28, 2069 (1963). The diisocyanato carbodiimides may also be prepared particularly carefully and free from by-products by a process of heterogeneous catalysis as disclosed in German Offenlegungsschriften numbers 25 04 400 and 25 52 350. The carbodiimidisation of diisocyanates in the presence of very small quantities of phospholine oxide followed by blocking of the catalyst with acid chlorides is described in DE-OS 26 53 120.

The compounds used as starting components for the diisocyanates containing carbodiimide groups are preferably aromatic diisocyanates of the type exemplified above under (a1).

Examples of suitable carboxylic acids of the formula R—COOH include acetic acid, propionic acid, hexane carboxylic acid, lauric acid, palmitic acid, stearic acid, benzoic acid, phenyl acetic acid, acrylic acid, methacrylic acid, crotonic acid, 10-undecenoic acid, oleic acid and linoleic acid. It is also possible in principle to use other monocarboxylic acids which do not conform to the above definition of R, e.g. chloro-acetic acid, cyclohexane carboxylic acid, abietic acid, 4-dimethylaminobenzoic acid or mono-esters or monamides of dicarboxylic acids such as oxalic acid, malonic acid, succinic acid, maleic acid, fumaric acid or phthalic acid with monohydric alcohols or amines. Any mixtures of the acids of the general formula R—COOH exemplified above could in principle be used. The quantity of acids put into the process is calculated to provide from 0.2 to 1.2 mol, preferably 0.5 to 1.2 mol, of carboxyl groups per mol of carbodiimide groups in the reaction mixture.

The isocyanate prepolymers with acyl urea groups which are also suitable for use as starting component (a3) may be prepared, for example, either by reaction of the above mentioned polyisocyanates containing acyl urea groups and based on low molecular weight diisocyanates with subequivalent quantities of polyhydroxyl compounds of the type mentioned below as examples under (b1) and/or (b2) or by partial carbodiimidisation of isocyanate prepolymers of the type given as examples under (a2) followed by reaction of the products of carbodiimidisation with carboxylic acids R—COOH by analogy with the method indicated above.

Other possible starting components (a) include, for example, (a4): hydrophilically modified polyisocyanates such as, for example, diisocyanates containing polyether side chains with incorporated ethylene oxide units according to U.S. Pat. No. 3,920,598. The use of such hydrophilically modified polyisocyanates is, however, less preferred because the hydrophilic groups are preferably incorporated by way of the starting components (b) described below.

It is also possible in principle to use the starting components (a1) to (a4) exemplified above in combination with higher functional low molecular weight polyisocyanates such as, for example, the reaction product of 3 mol of 2,4-diisocyanato toluene with one mol of trimethylol propane and/or in combination with monofunctional isocyanates such as phenyl isocyanate, hexyl isocyanate or n-dodecyl isocyanate. Monofunctional isocyantes containing polyether chains with incorporated ethylene oxide units, of the type mentioned, for example, in U.S. patent specification Nos. 3,920,598 and 4,237,267 could in principle also be used. When such monofunctional isocyanates are used, however, premature chain breaking should generally be prevented by also adding higher than difunctional starting components, especially for preparing high molecular weight polyurethanes. Difunctional isocyanates of the type exemplified above are preferably used as starting components (a).

The following are examples of suitable starting components (b):

(b1) The polyhydroxy-polyesters or polyethers in the molecular weight range of from 400 to 4,000 known from polyurethane chemistry, preferably the difunctional compounds of this type which may be obtained in a known manner by the reaction of polybasic acids, in particular dibasic acids such as adipic acid, phthalic acid, tetrahydrophthalic acid and/or hexahydrophthalic acid with excess quantities of polyhydric alcohols, preferably dihydric alcohols of the type mentioned below under (b2), or by the alkoxylation of suitable starter molecules such as water, ammonia or aniline or the polyhydric alcohols mentioned below under (b2) with alkylene oxides such as ethylene oxide and/or propylene oxide.

The following are further examples of suitable starting components (b):

(b2) Polyhydric alcohols, in particular dihydric alcohols in the molecular weight range of from 62 to 399, in particular the corresponding alkane polyols such as, for example, ethylene glycol, propylene glycol, tetramethylene diol, hexamethylene diol, glycerol, trimethylol propane or trimethylol ethane or low molecular weight alcohols containing ether groups, such as diethylene glycol, triethylene glycol, dipropylene glycol or tripropylene glycol. Any mixtures of such alcohols may also be used.

The following are also examples of suitable starting components (b):

(b3) compounds in the molecular weight range of from 32 to 400 containing at least two aminic or hydrazinic amino groups, such as, for example, ethylene diamine, hexamethylene diamine, isophorone diamine, 2,4-diamino toluene, 4,4'-diamino diphenyl methane, 4,4'-diaminodicyclohexyl methane, diethylene triamine, triethylene tetramine, hydrazine and hydrazine hydrate. Starting components of this type may also be used in a blocked form, i.e. in particular in the form of the corresponding ketimines or ketazines (reaction products with simple ketones such as acetone, methyl ethyl ketone or methyl isobutyl ketone). When such blocked chain lengthening agents are used, the isocyanate reactive groups are subsequently released under the hydrolytic action of the water of dispersion.

The following are further examples of suitable starting components (b):

(b4) ionic starting components or potentially ionic starting components, which generally have a molecular weight of from 60 to 400, preferably from 89 to 400 and contain at least one ternary or quaternary ammonium group or a group capable of conversion into such a group in addition to at least one isocyanate reactive group. Compounds of this type include, for example, amino alcohols containing tertiary amine nitrogen in which the tertiary nitrogen atoms may be at least partially converted into ternary or quaternary ammonium groups by neutralization or quaternisation during or after termination of the isocyanate poly-addition reaction; for example, N-methyl-diethanolamine, N-butyl-diethanolamine, N-methyl-diisopropanolamine, N-ethyl-diethanolamine, N-ethyl-diisopropanolamine, or N,N'-bis-(2-hydroxy-ethyl)-perhydropyrazine or corresponding monohydric alcohols such as N,N-dimethyl-ethanolamine, 2-(2-dimethyl amino-ethoxy)-ethanol, N,N-diethyl ethanolamine, 2-(2-diethyl-amino-ethoxy)-ethanol, N,N-di-n-butyl-amino-ethanol, N-(3-hydroxy-propyl)dimethylamine, N-(2-hydroxy propyl)-dimethylamine, 1-diethylamino-2-propanol or 1,3-bis-(dimethyl amino)-2-propanol. Compounds of this type also include analogous starting components containing at least one tertiary amino group, i.e. potential ternary or quaternary ammonium groups and containing at least one primary or secondary aminic or hydrazinic amino group instead of the hydroxyl group or groups, e.g. N-methyl-bis-(3-aminopropyl)-amine, N-methyl-bis-(2-aminoethyl)-amine or N,N',N''-trimethyl-diethylene triamine, as well as monofunctional compounds, e.g. 1-amino-2-diethyl amino-ethane, 1-amino-3-dimethyl amino-propane, 1-amino-3-diethyl amino-propane or N,N-dimethyl-hydrazine.

Incorporation of the ionic groups, i.e. of the ternary or quaternary ammonium groups, is preferably carried out by including starting components containing tertiary amino groups and converting the tertiary amino groups into the corresponding ammonium groups by neutralization with inorganic or organic acids such as, for example, hydrochloric acid, sulphuric acid, acetic acid, fumaric acid, maleic acid, lactic acid, tartaric acid, oxalic acid, N-methyl-N-(methylaminocarbonyl)-aminomethane sulphonic acid, formic acid or phosphoric acid or by quaternisation with suitable quaternising agents such as alkyl halides, epihalogen hydrines or mono epoxides, in particular methyl chloride, methyl iodide, dimethyl sulphate, benzyl chloride, ethyl chloro acetate or bromoacetamide. Further examples of suitable neutralising or quaternising agents are disclosed in DE-OS 28 27 156. This neutralization or quaternisation of the starting components containing tertiary nitrogen may in principle be carried out before or during the isocyanate poly-addition reaction but this is less preferred. Ternary or quaternary ammonium groups may also be introduced into the polyisocyanate poly addition products by reaction with polyether polyols containing tertiary amino groups used as starting components (b1) followed by neutralization or quaternisation of the tertiary amino groups. This again is not a preferred embodiment of the process according to the invention.

In all variations of the process, the quantity of starting components containing tertiary amino groups or ammonium groups or the degree of neutralization or quaternisation is chosen so that the end products of the process according to the invention contain from 2 to 300, preferably from 2 to 200, most preferably from 5 to 100 milli-equivalents of ternary or quaternary ammonium groups per 100 g of solids content.

The following are also examples of suitable starting components (b) according to the invention:

(b5) monohydric and dihydric alcohols containing ethylene oxide units incorporated in polyether chains. These include, for example, compounds corresponding to the following general formula:

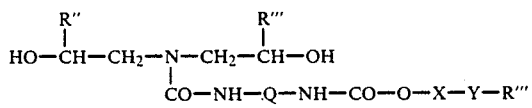

wherein

Q denotes a divalent group such as may be obtained by remooval of the isocyanate groups from a diisocyanate of the formula Q(NCO)$_2$ of the type mentioned under (a1), R" denotes hydrogen or a monovalent hydrocarbon group containing 1 to 8 carbon atoms, preferably hydrogen or a methyl group, R''' denotes a monovalent hydrocarbon group containing 1 to 12 carbon atoms, preferably an unsubstituted alkyl group containing 1 to 4 carbon atoms, X denotes a group such as may be obtained by removal of the terminal oxygen atom from a polyalkylene oxide chain containing 5 to 90, preferably 20 to 70 chain members, at least 40% of which, preferably at least 65% are ethylene oxide units while the remaining chain members may include propylene oxide, butylene oxide and styrene oxide units, propylene oxide units being preferred among the last three mentioned units, and Y denotes oxygen or NR$^{iv}$, where R$^{iv}$ has the definition given for R'''.

Preparation of the compounds corresponding to the last mentioned formulae may be carried out by the methods according to U.S. Pat. No. 3,905,929 or U.S. Pat. No. 4,190,566.

Also to be included among the preferred hydrophilic components (b5) are compounds corresponding to the general formula

HO-X-Y-R''' wherein

X, Y and R''' have the meanings already mentioned. When such monofunctional, non-ionic hydrophilic polyethers are included in the starting components, it may frequently be advantageous to prevent premature chain breaking by the addition of more than difunctional starting components.

Monofunctional polyethers corresponding to the last mentioned general formula are prepared by known methods, for example as described in U.S. patent specification Nos. 3,905,929, 4,190,566 and 4,237,264.

Suitable starting components (b) also include:

(b6) amino alcohols in the molecular weight range of from 61 to 300 which are free from tertiary nitrogen, e.g. ethanolamine, propanolamine, diethanolamine or dipropanolamine.

The following are also suitable starting components (b):

(b7) Polyhydric, preferably dihydric alcohols containing acyl urea groups, which alcohols may be obtained, for example, by the reaction of the acyl-containing diisocyanates exemplified under (a3), in particular those based on low molecular weight starting diisocyanates, with the compounds exemplified under (b1), (b2) and/or (b6) under conditions maintaining an OH/NCO ratio of from 1.2:1 to 30:1 or, when amino alcohols (b6) are used, an NH$_2$/NCO ratio of from 0.6:1 to 1.2:1. Alternatively, and preferably, these polyhydric alcohols containing acyl urea groups may be obtained by the reaction of polyisocyanates containing carbodiimide groups mentioned in the description of component (a3), preferably diisocyanates based on low molecular weight starting isocyanates, with the above mentioned polyhydroxyl compounds under conditions maintaining an OH/NCO equivalent ratio from 1.2:1 to 30:1 or, when amino alcohols (b6) are used, an NH$_2$/NCO ratio of from 0.6:1 to 1.2:1, followed by reaction of the reaction products with carboxylic acids R—COOH in accordance with the details given above. When starting materials containing hydroxyl groups as exemplified under (b1) and/or (b2) are used, the reaction of the polyhydroxyl component with the isocyanate component is preferably carried out under conditions maintaining an OH/NCO equivalent ratio of from 1.5:1 to 15:1, in particular from 1.5:1 to 3:1. Preparation of the starting components (b7) containing hydroxyl groups or of the intermediate products with carbodiimide groups used for their preparation is generally carried out at temperatures in the range of from 25° to 130° C., preferably from 50° to 120° C., optionally in the presence of an inert solvent of the type exemplified in DE-OS 27 14 293. Details of the preparation of such polyhydroxyl compounds containing acyl urea groups are also given in the said prior publication.

Lastly, another compound to be mentioned as suitable starting component (b) is (b8) water, which serves the double purpose of acting as continuous phase of the dispersion according to the invention and being able to function as chain lengthening agent. Starting components (b) which are difunctional in the isocyanate addition reaction are preferably used although monofunctional starting components (b) may also be used, in particular compounds of the type mentioned under (b4) or (b5). Furthermore, starting components (b) which are higher than difunctional may be used for obtaining molecular branching.

The following are examples of auxiliary agents and additives (c) optionally used:

(c1) Solvents optionally used in the synthesis of the polyurethanes. Examples of suitable solvents include toluene, xylene, acetone, methylglycol acetate, ethylglycol acetate, propyleneglycol monomethylether acetate, butyl acetate, N-methylpyrrolidone, ethyl acetate and methylethyl ketone. Water miscible solvents such as acetone or N-methylpyrrolidone are preferably used.

The following are further exmamples of auxiliary agents and additives (c):

(c2) Compounds which react with isocyanate groups to form acylated amino groups and compounds which are capable of reacting with such acylated amino groups by a condensation reaction. Examples of the first mentioned compounds include ammonia and urea while examples of the last mentioned compounds include any aldehydes, in particular formaldehyde.

The following are further examples of auxiliary agents and additives (c) optionally used:

(c3) Any accelerators for the isocyanate poly-addition reaction known from polyurethane chemistry although the addition of these catalysts is generally not necessary.

Prepartion of the emulsifiers to be used according to the invention may be carried out by methods known in the art, e.g. as disclosed in DE-OS 35 23 856.

Polymerisation of the monomer mixture of (A) and (B) is preferably carried out in the presence of from 10 to 70% by weight of the cationically modified polyurethane, based on the monomer mixture.

It is particularly preferred to employ a ratio by weight of cationically modified polyurethane to monomer mixture of (A) and (B) of from 1:4 to 1:1.

The emulsion polymer according to this invention is preferably obtained as a colloid disperse solution having an average particle diameter of preferably from about 15 to about 200 nm, most preferably from 20 to 150 mn.

For emulsification it is generally sufficient to use the cationic polyurethane compound without any further additives for emulsion polymerisation but in some cases it is found to be very advantageous to use oligomeric, non-ionogenic and/or low molecular weight cationic auxiliary emulsifiers together with the polymeric cationic emulsifiers, these auxiliary emulsifiers being preferably used in proportions by weight of from 1 to 40% by weight, most preferably from 3 to 20% by weight, based on the cationic polyurethane emulsifier.

Reaction products of aliphatic, araliphatic, cycloaliphatic or aromatic carboxylic acids, alcohols, phenol derivatives or amines with epoxides, e.g. with ethylene oxide, may be used as non-ionogenic auxiliary emulsifiers.

Examples of such non-ionogenic auxiliary emulsifiers include the reaction products of ethylene oxide with carboxylic acids such as lauric acid, stearic acid, oleic acid, the carboxylic acids of castor oil and abietic acid; the reaction products of ethylene oxide with relatively long chained alcohols such as oleyl alcohol, lauryl alcohol, or stearyl alcohol; the reaction products of ethylene oxide with phenol derivatives such as substituted benzyl or phenyl phenols or nonyl phenol; and the reaction products with relatively long chained amines such as, for example, dodecylamine or stearylamine. These reaction products with ethylene oxide are oligo or polyethers with degrees of polymerisation of from 2 to 100, preferably from 5 to 50.

Preferred non-ionogenic emulsifiers correspond to the following formula:

$$R_1-X-(CH_2-CH_2-O)_n-H$$

wherein
X denotes O, NH or COO,
$R_1$ denotes an aliphatic, cycloaliphatic, araliphatic or aromatic hydrocarbon group with 6–30 carbon atoms and
n represents an integer $\geq 2$.

Preferred cationic auxiliary emulsifiers correspond to the following formula:

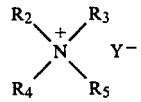

wherein
$R_2$ and $R_3$ denote aliphatic or araliphatic hydrocarbon groups containing 6 to 20 carbon atoms,
$R_4$ and $R_5$ denote lower aliphatic hydrocarbon groups containing 1 to 6 carbon atoms and
$Y^-$ denotes a halide ion. Benzyldodecyldimethyl ammonium chloride is an example.

The initiators used for the emulsion polymerisation are preferably water soluble, non-ionogenic peroxides which yield radicals, such as hydrogen peroxide and t-butyl hydroperoxide, and water soluble azo compounds as described, for example, in DE-OS 2 841 045. Redox systems consisting of peroxidic initiators and reducing agents such as amines, polyamines, thio urea or iron-II salts, etc. are also suitable. Water insoluble compounds such as azo-isobutyronitrile and benzoyl peroxide may also be used as initiators. These water insoluble initiators are dissolved virtually only in the organic phase. The initiators are added in quantities of from 0.1 to 5% by weight, preferably 0.3 to 3.0% by weight, based on the monomer mixture.

Conventional molecular weight regulators may be added to regulate the molecular weights of the polymers, e.g. n-dodecyl mercaptan, t-dodecyl mercaptan, diisopropyl xanthogen disulphide, thioglycol and thioglycerol. They are added in quantities of from 0.1 to 2% by weight, based on the monomer mixture.

Emulsion polymerisation in the aqueous medium may be carried out by known polymerisation processes, either continuously or batchwise, or by the inflow process.

The continuous process and the inflow process are particularly preferred. In the inflow process, water and part or all of the emulsifier system and optionally a proportion of the monomer mixture are introduced into the reaction vessel under a nitrogen atmosphere and heated to the preferred polymerisation temperature of from 20° to 150° C., most preferably from 50° to 100° C., and the monomer mixture and the initiator and optionally emulsifier are added dropwise within a period of 0.5 to 10 hours, preferably one to six hours.

After some time, the reaction mixture is reactivated and the reaction is completed to a conversion rate of about 99.0% to 99.9% by weight. The ratio by weight of emulsifier to polymer in this process is from 1:9 to 7:3, preferably from 1:4 to 1:1. Residual monomers and any organic solvents still present are removed by distillation under vacuum after the emulsion copolymerisation. Thereafter, water is added until an approximately 10 to 35% by weight aqueous colloid disperse solution results. The viscosity of these dispersions, determined in a rotation viscosimeter at 20° C., is generally below 50 mPa.s. The average particle diameters, determined by laser scattered light spectroscopy, are in the range of from 15 to 200 nm, preferably from 20 to 150 nm. depending on the reaction conditions.

Dispersions with particle sizes below 50 mn appear transparent whereas dispersions with larger particles appear cloudy. The stability of the dispersions with particle sizes below 100 nm is also better than with particle sizes above 100 nm, as may be shown, for example, by exposing the dispersions to temperatures above 80° C. In dispersions with coarser particles, the proportion of sediment is considerably greater than in finely divided dispersions.

The stability of the colloid disperse sizes according to this invention is also increased by graft components of the polymer on the polymeric emulsifier which is present in relatively large quanitites. Such grafting reactions, which are released by the emulsifier by transfer reactions, are known from the literature (see H. Gerrens, Fortschritte der Hochpolymer-Forschung, Volume I, (1959) page 300).

The paper sizes according to this invention may be used by any of the methods conventionally used for surface sizing and body sizing in the manufacture of paper.

Preparation of the cationic emulsifiers based on polyurethane

EXAMPLE 1

(Emulsifier A)

Preparation of an aqueous dispersion of the cationic emulsifier was carried out by a method analogus to that of Example 1 of DE-OS 35 23 856, using the starting components mentioned there. A finely divided dispersion having a solids content of 38.6% by weight and a quaternary ammonium group content of 80 milliequivalents/100 g of solids content and containing 6.7%, based on the solids content, of acylated urea groups of the formula

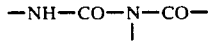

was obtained.

EXAMPLE 2

(Emulsifier B)

Preparation of the aqueous dispersion of cationic emulsifier was carried out by a method analogous to that of Example 1 of DE-OS 35 23 856, using the starting components mentioned there. 1,3-bis-(dimethylamino)-propanol was used instead of N-methyl-diethanolamine. A finely divided dispersion having a solids content of 30.6% by weight and a quaternary ammonium group content of 100 milliequivalents per 100 g of solids content and containing 10.6% by weight of acylated urea groups of the formula

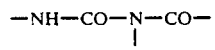

based on the solids content was obtained.

EXAMPLES 3 to 5

15,660 g of deionized water is introduced into a 40 liter stirrer autoclave. The water is then vigorously boiled in a nitrogen atmosphere and cooled to 65° C. The emulsions I (see Table 1) are then added with exclusion of air. 10 g of 35% hydrogen peroxide in 50 g of deionized water are added. After about 30 minutes, the monomer mixtures II and initiator mixtures III are added over a period of about 4 hours. Stirring is then continued for a further 2 to 5 hours, the reaction mixture is reactivated with solutions IV, and after-polymerisation is carried out for about 2 to 10 hours. About 1.5 to 2 liters of a mixture of water and residual mnomers are then distilled off in a water jet vacuum at about 200 mbar and replaced by the same quantity of deionised water. The physical-chemical properties of the resulting colloid disperse solutions are shown in Table 1.

EXAMPLES 6 to 8

12,320 g of deionised water are introduced into a 40 liter stirrer autoclave. The water is then vigorously boiled in a nitrogen atmosphere and cooled to 70° C. Emulsions I (see Table 2) are then added with exclusion of air. 10 g of t-butyl-hydroperoxide and a solution of 4 g of Rongalite C of 100 g of deionised and degasified water are then added simultaneously. After about 30 minutes, the monomer mixtures II, initiator mixtures III and aqueous Rongalite solutions IV are added over a period of about 4 hours. Stirring is then continued for a further 2 to 5 hours and the reaction mixture is reactivated with solutions V and VI and after-polymerised for about 2 to 10 hours. 1.5 to 2 liters of a mixture of water and residual monomers are then distilled off in a water jet vacuum at about 200 mbar and replaced by the same quantity of deionised water. The physical-chemical properties of the resulting colloid disperse solutions are also entered in Table 2.

TABLE 1

| | | Example | | |
|---|---|---|---|---|
| | | 3 | 4 | 5 |
| I. | Emulsifier A (g) | 6,480 | 6,480 | 6,480 |
| | Acrylonitrile (g) | 200 | 250 | 300 |
| | Acrylic acid-n-butyl ester (g) | 300 | 250 | 200 |
| | Lactic acid (g) | 200 | 200 | 200 |
| II. | Acrylonitrile (g) | 1,800 | 2,250 | 2,700 |
| | Acrylic acid-n-butyl-ester (g) | 2,700 | 2,250 | 1,800 |
| III. | Hydrogen peroxide (35%) (g) | 100 | 100 | 100 |
| | Deionised water (g) | 2,000 | 2,000 | 2,000 |
| IV. | Hydrogen peroxide (35%) (g) | 20 | 20 | 20 |
| | Deionised water (g) | 500 | 500 | 500 |
| | Concentration (% by weight) | 24.5 | 24.9 | 24.8 |
| | Viscosity at 23° C. (mPa · s) | <50 | <50 | <50 |
| | pH | 3.5 | 4.0 | 3.8 |
| | Average particle diameter (nm) | 35 | 51 | 51 |

TABLE 2

| | | Example | | |
|---|---|---|---|---|
| | | 6 | 7 | 8 |
| I. | Emulsifier B (g) | 7,360 | 7,360 | 7,360 |
| | Acrylonitrile (g) | 260 | — | — |
| | Styrene (g) | — | 260 | — |
| | Methylmethacrylate (g) | — | — | 260 |
| | Acrylic acid-n-butyl ester (g) | 260 | 260 | 260 |
| | Lactic acid (g) | 200 | 200 | 200 |
| II. | Acrylonitrile (g) | 2,360 | — | — |
| | Styrene (g) | — | 2,360 | — |
| | Methylmethacrylate (g) | — | — | 2,360 |
| | Acrylic acid-n-butyl-ester (g) | 2,360 | 2,360 | 2,360 |
| III. | t-butyl-hydroperoxide (g) | 120 | 120 | 120 |
| | deionised water (g) | 2,000 | 2,000 | 2,000 |
| IV. | Rongalite C (g) | 20 | 20 | 20 |
| | Deionised water (g) | 2,000 | 2,000 | 2,000 |
| V. | t-butyl-hydroperoxide (g) | 20 | 20 | 20 |
| | Deionised water (g) | 500 | 500 | 500 |
| VI. | Rongalite C (g) | 4 | 4 | 4 |
| | Deionised water (g) | 100 | 100 | 100 |
| | Concentration (% by weight) | 25.6 | 26.4 | 26.9 |

TABLE 2-continued

|  | Example | | |
|---|---|---|---|
|  | 6 | 7 | 8 |
| Viscosity at 23° C. (mPa · s) | 50 | 50 | 50 |
| pH | 4.1 | 4.1 | 4.1 |
| Average particle diameter (nm) | 63 | 107 | 64 |

Example of Practical Application 1

This example illustrates the possibility of using the sizing agents described above in the paper pulp.

From 0.5 to 1.0% by weight of size (active substance based on dry cellulose) are added to a paper pulp composed of 50% by weight of bleached birch sulphate, 50% by weight of bleached pine sulphate cellulose and 25% of chalk additive (degree of grinding 35° SR) at a pulp density of 0.5% by weight and a pH of 7.2 with stirring. Immediately thereafter, paper sheets are formed on a laboratory sheet forming apparatus and dried at 100° C.

The dried paper weights about 80 g/m².

The sizing effect is tested by the one sided absorption of water, the so called Cobb Test according to DIN 53 132, carried out for 60 seconds. The aqueous solution of size of Example 2 of the present application is used for comparison.

TABLE 3

| Size from Example | $Cobb_{60}$ in g/m² after the addition of | | | | |
|---|---|---|---|---|---|
|  | 0.5 | 0.6 | 0.7 | 0.8 | 1.0 |
|  | % by weight of size (based on active substance) to the paper pulp. | | | | |
| 3 | 41 | 26.7 | 26.4 | 23.8 | — |
| 4 | 38 | 25.9 | 24.1 | 23.1 | — |
| 5 | 37 | 25.2 | 22.8 | 22.4 | — |
| 6 | 36 | 24.8 | — | 22.1 | 21.0 |
| 7 | 42 | 30.5 | 26.1 | 24.8 | — |
| Comparison (Example 2) | 101 | 93 | — | 76 | 49 |

Without size, the Cobb Value is above 135 g/m².

Example of Practical Application 2

This example again demonstrates the use of the described siz in paper pulp. From 0.5 to 1.0% by weight of size (active substance based on dry cellulose) are added with stirring to a paper pulp of 50% by weight of bleached birch sulphate, 50% by weight of bleached pine sulphate cellulose and 25% of clay additive (degree of grinding 30° SR) at a pulp density of 0.5% by weight and a pH of 7.0.

Paper sheets are formed immediately thereafter in a laboratory sheet forming apparatus and dried at 100° C. The dry sheets weigh about 80 g/m².

The sizing effect is again determined by the Cobb Test. The aqueous solution of size of Example 2 is again used for comparison.

TABLE 4

| Size from Example | $Cobb_{60}$ in g/m² after the addition of | | | |
|---|---|---|---|---|
|  | 0.5 | 0.6 | 0.8 | 1.0 |
|  | % by weight of size (based on active) substance) to paper pulp: | | | |
| 5 | 58 | 39 | 29.2 | 25.8 |
| 6 | 61 | 40 | 28.7 | 26.1 |
| 7 | 63 | 44 | 33.1 | 27.8 |
| Comparison (Example 2) | 110 | 98 | 83 | 62 |

Without size, the Cobb Value is above 137 g/m².

Example of Practical Application 3

This example demonstrates the negligible tendency to foaming of the size according to the invention compared to sizes M and N which correspond to sizes 3 and 10 of EP-OS 0 058 313. The tendency to foaming is determined in the absence of additives such as additional emulsifiers and de-foaming agents.

0.4% by weight of active substance are dissolved in a size bath of 5% by weight of commercial starch (Perfectamyl A 4692 ®) and heated to 60° C. 200 ml of this bath are transferred by free fall from an aluminium vessel which has a circular opening of 4 mm in diameter on its underside (Ford Cup) into a graduated glass beaker from a height of 60 cm. The volume (in ml) of the foam which forms over the surface of the liquid is determined both immediately and after the liquid has been left to stand in air for one minute. The first value obtained gives information on the tendency of the size to form foam and the second value gives an indication of the speed of breakdown of the foam, i.e. its stability.

TABLE 5

| | Foaming Tendency of Sizes | |
|---|---|---|
| | Volume of Foam in ml | |
| Size from Example | Immediately | After 1 min. |
| 3 | 10 | 0 |
| 4 | 10 | 0 |
| 5 | 20 | 0 |
| 6 | 10 | 0 |
| 7 | 10 | 0 |
| 8 | 10 | 0 |
| M | 100 | 50 |
| N | 70 | 30 |

Surface Sizing

The sizing bath used for surface sizing is a solution of 5% by weight of starch (Perfectamyl ® A4692 of AVEBE) and 0.25% by weight or 0.30% by weight, respectively, of the size to be tested (calculated as active substance) in 94.75% by weight or 94.70% by weight, respectively, of water.

Sizing is carried out in a laboratory sizing press, model HF of Werner Mathis, Zurich. The sizing bath is at a temperature of about 20° C. in the sizing press. The paper is passed through at a rate of 4 m/Minute.

Drying of the surface-sized papers is carried out on a drying cylinder for about 45 seconds at about 100° C. Before the sizing test is carried out, the papers are conditioned to room temperature for 2 hours. Sections of the papers are then weighed, immersed in water at 20° C. for 1 minute, pressed between two filter papers under a roller weight of 10 kg and reweighed.

Example of Practical Application 4

This example demonstrates the good effect of some sizes on paper which is free from aluminium sulphate.

The raw paper used has the following composition and properties: 50% by weight of conifer cellulose;

50% by weight of hardwood cellulose; 9.5% by weight of clay ash; pH in breastbox: 7.5; absorption of liquid in laboratory sizing press: about 80% by weight; weight of paper: 80 g/m².

TABLE 6

Surface sizing on paper free from aluminium sulphate.

| Size from Example | Absorption of water in g/m² after the addition of | |
|---|---|---|
| | 0.25% by weight Of Size (based on pure active substance) to Sizing Bath: | 0.30% by weight |
| 3 | 39.0 | 28.5 |
| 4 | 33.0 | 27.3 |
| 5 | 29.2 | 26.2 |
| 6 | 30.0 | 28.0 |

Without Size, the water absorption is 89.0 g/m²

We claim:

1. Paper sizes consisting essentially of an emulsion polymer obtained by emulsifying a monomer mixture of
   (A) 5-95% by weight of acrylonitrile, methacrylonitrile and/or substituted or unsubstituted styrene and
   (B) 5-95% by weight of acrylic and/or methacrylic acid esters containing 1-12 carbon atoms in the alcohol group, the sum of components (A)+(B) amounting to 100% by weight, in the presence of an aqueous solution or dispersion of a cationically modified polyurethane, and subjecting the resulting emulsion to a radically initiated polymerization wherein
   the polymers are present in the form of colloid disperse solutions having average particle diameters of 15 to 200 mm.

2. A paper size according to claim 1, wherein the aqueous solution or dispersion of cationically modified polyurethane used as emulsifier is prepared by the reaction of
   (a) organic polyisocyanates, with
   (b) compounds containing isocyanate reactive groups, and conversion of the resulting polyisocyanate addition product into an aqueous solution or dispersion during or after the poly-addition reaction, the starting components (b) consisting of or including starting components containing ternary or quaternary ammonium groups or groups capable of being converted into such groups, the at least partial conversion of the groups capable of being converted into salt groups of the type mentioned above taking place during or after poly-addition, the total quantity of such hydrophilic starting components being so calculated that the polyisocyanate polyaddition product contains the quantity of ternary or quaternary ammonium groups required to ensure its solubility or dispersibility in water, preferably from 2 to 300 milliequivalents per 100 g of solids content.

3. A paper size according to claim 1, obtained by using starting components (a) and/or (b) which consist at least in part of starting components containing acyl urea groups corresponding to the following formula

wherein R denotes an organic group, preferably a saturated or unsaturated aliphatic hydrocarbon group having 1 to 35 carbon atoms, an aryl group having 6 to 10 carbon atoms or an araliphatic group having 7 to 10 carbon atoms, and when several groups R are present in the same molecule, they may differ from one another.

4. A paper size according to claim 1, obtained by carrying out the polymerisation of the monomer mixture of (A) and (B) in the presence of 10 to 70% by weight, based on the monomer mixture, of cationically modified polyurethane.

5. A paper size according to claim 2, obtained by carrying out the emulsion polymerisation in the presence of an oligomeric, non-ionogenic and/or a low molecular weight, cationic auxiliary emulsifier.

6. A paper size according to claim 5, characterized in that the auxiliary emulsifier is used in quantities of 1 to 40% by weight, preferably 3 to 20% by weight, based on the cationically modified polyurethane.

7. A paper size according to claim 2, obtained by initiating the emulsion polymerisation with water soluble, non-ionogenic peroxides and/or azo compounds which give rise to radicals in quantities of from 0.1 to 5% by weight, based on the monomer mixture.

8. A paper size according to claim 1, wherein the polymers are present in the form of colloid disperse solutions having average particle diameters of 20 to 150 mm.

9. Paper which has been sized with the paper size according to claim 1.

* * * * *

UNITED STATES PATENT AND TRADEMARK OFFICE
CERTIFICATE OF CORRECTION

PATENT NO. : 4,904,727

DATED : February 27, 1990

INVENTOR(S) : Probst et al.

It is certified that error appears in the above-identified patent and that said Letters Patent is hereby corrected as shown below:

Col. 12, table 1 line 33  Under Example " 3 and 4 " delete " 300  250  200 " and substitute under Example   3   4   5
-- 300  250  200 --

Signed and Sealed this

Nineteenth Day of November, 1991

Attest:

HARRY F. MANBECK, JR.

Attesting Officer     Commissioner of Patents and Trademarks